July 14, 1959 W. H. B. SMITH 2,894,346
FIRING MECHANISM WITH A SINGLE SPRING FOR THE
HAMMER, HAMMER CATCH MEANS AND TRIGGER
Filed April 5, 1956 5 Sheets-Sheet 1
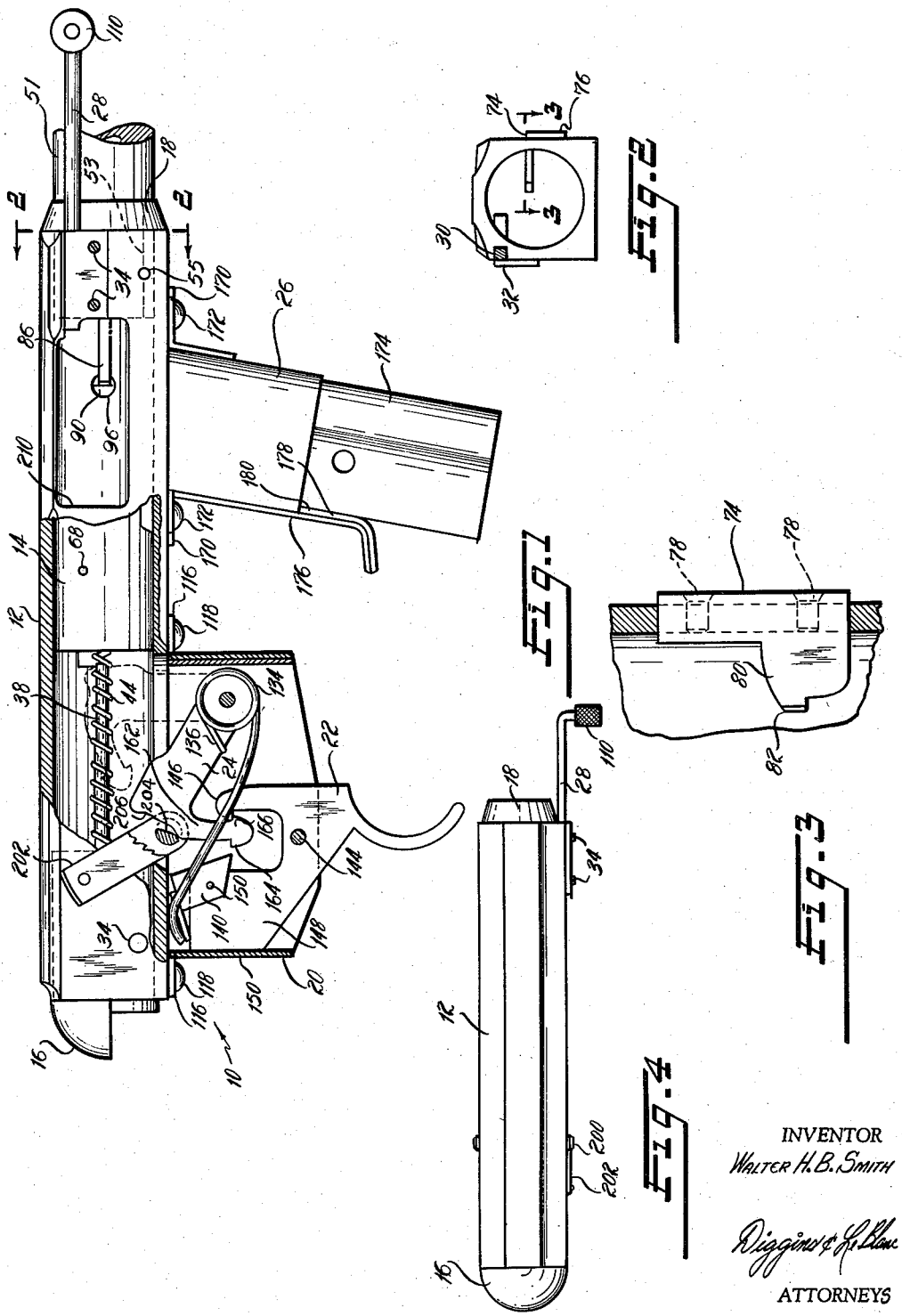
INVENTOR
WALTER H. B. SMITH
ATTORNEYS July 14, 1959 W. H. B. SMITH 2,894,346
FIRING MECHANISM WITH A SINGLE SPRING FOR THE
HAMMER, HAMMER CATCH MEANS AND TRIGGER
Filed April 5, 1956 5 Sheets-Sheet 2
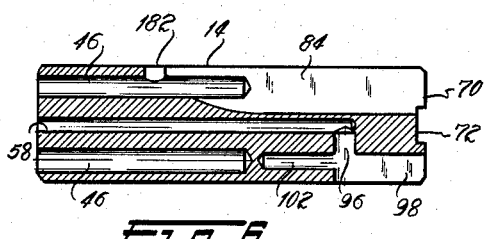
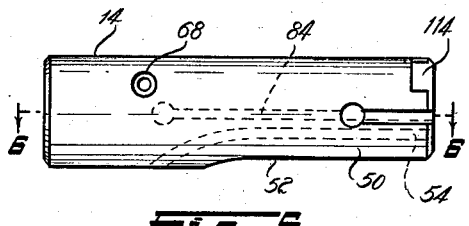
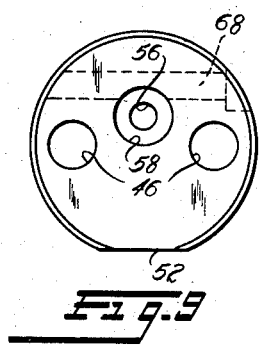
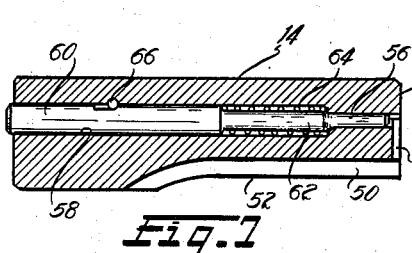
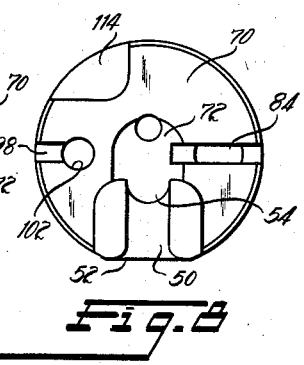
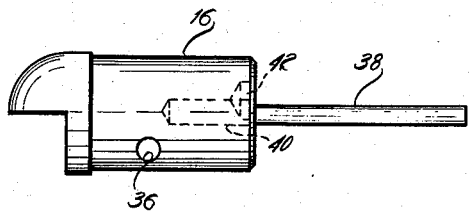
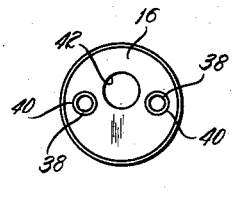
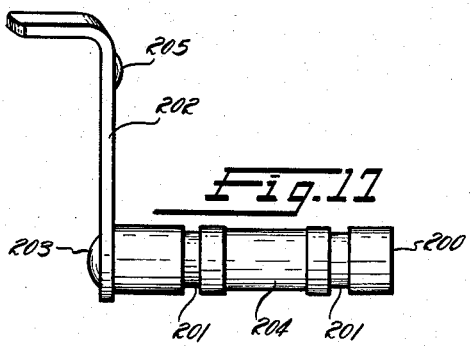
INVENTOR
WALTER H. B. SMITH
ATTORNEYS

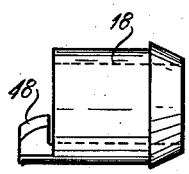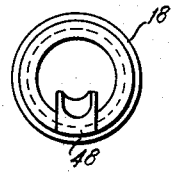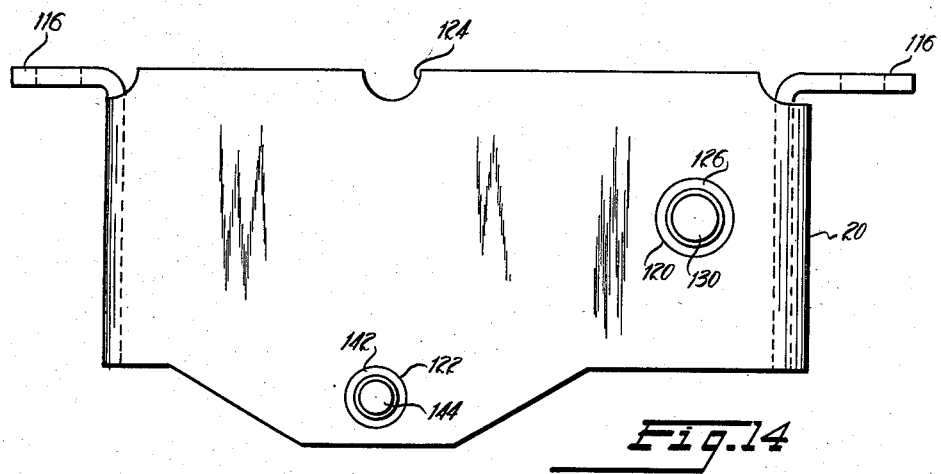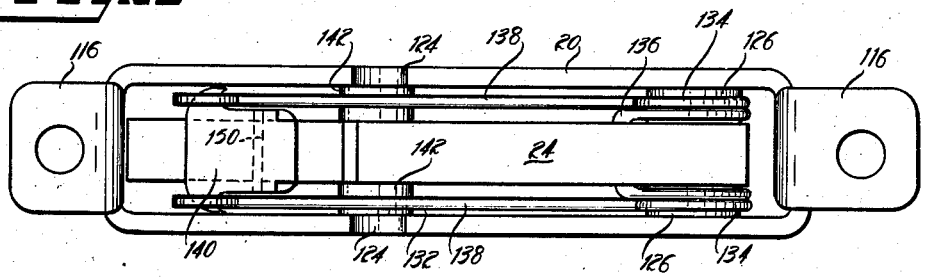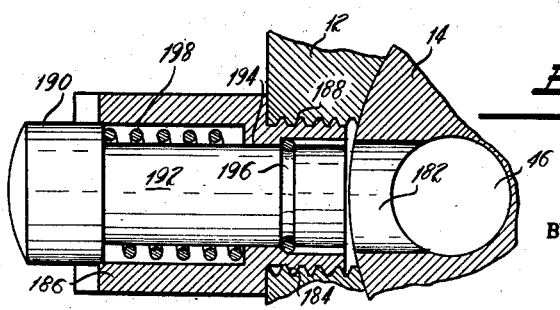

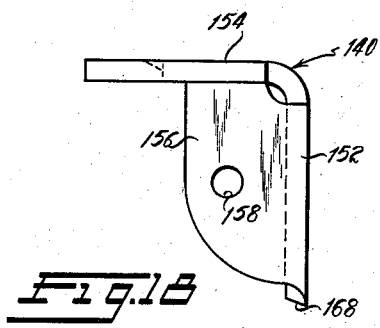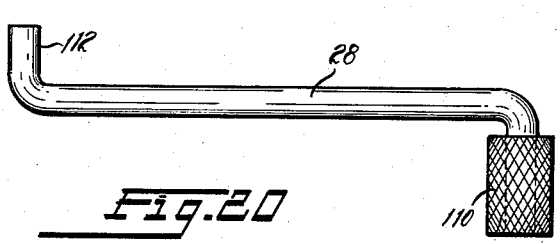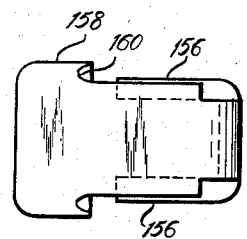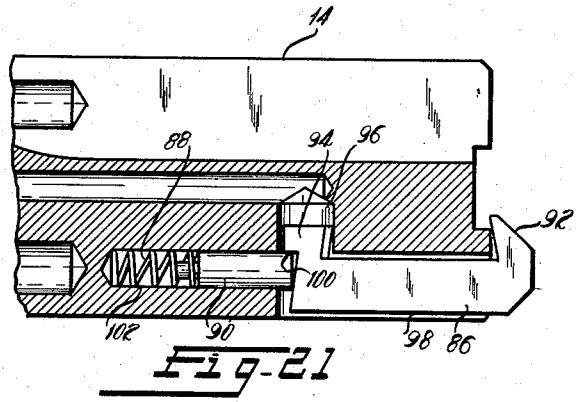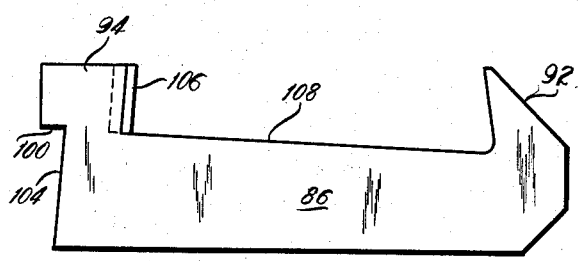

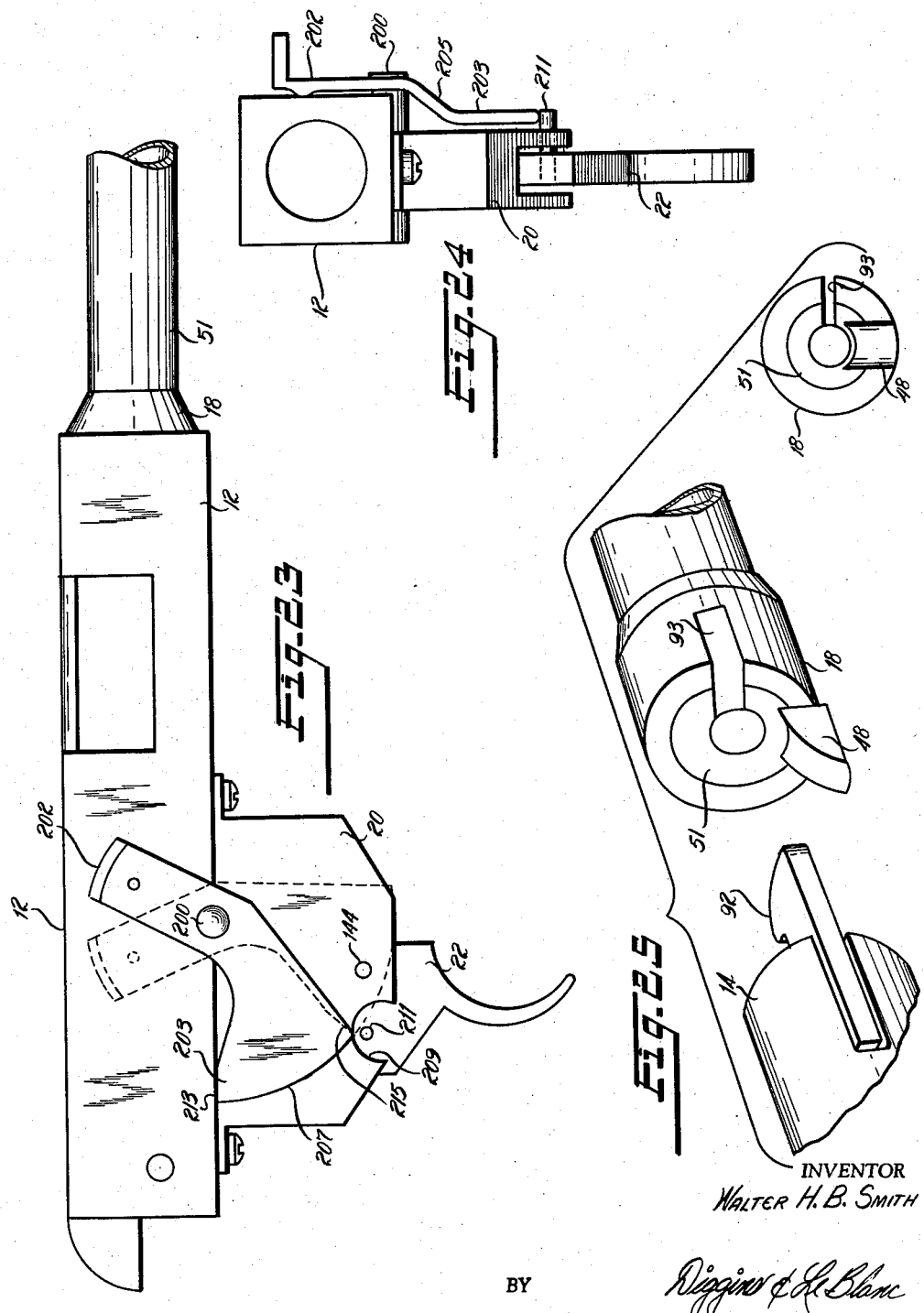

United States Patent Office 2,894,346
Patented July 14, 1959

2,894,346

FIRING MECHANISM WITH A SINGLE SPRING FOR THE HAMMER, HAMMER CATCH MEANS AND TRIGGER

Walter H. B. Smith, New York, N.Y.

Application April 5, 1956, Serial No. 576,275

13 Claims. (Cl. 42—69)

This invention relates to firearms and more particularly relates to a simple low cost firing mechanism for use in a variety of firearms.

Small caliber semi-automatic rifles heretofore available have generally utilized actions which are either relatively expensive to produce or, being inexpensive, are equipped with inadequate safety features and are subject to frequent stoppages and jamming. A large number of springs are normally utilized requiring additional parts, seats or holding devices for retaining and/or guiding the spring action and this adds to manufacturing and tooling costs. The bolts generally have not been adequately restrained against twisting torque during reciprocation in the receiver and this has made cartridge feeding unreliable. Charging is conventionally accomplished by means of a charging or cocking lever projecting from the bolt through a slot in the receiver thereby necessitating an extra slot in the receiver and a projecting reciprocating member. This type of charger complicates dismantling the arm and in many designs its movement is in the line of vision and interferes with correct aiming procedures. In other designs where the charging device is concealed within the stock additional parts and complicated manufacture are necessary. Safety mechanisms usually lock only the trigger with the result that forcing of the trigger frequently makes it possible to fire the piece despite the safety. While certain of these disadvantages may have been remedied at least partially in some prior mechanisms, to my knowledge there has been no simple low cost firing mechanism which eliminated them all.

According to my invention I have provided a simple and sturdy firing mechanism which contains a minimum number of springs and parts and which may be manufactured at a relatively low cost. A single torsion spring is utilized to operate the hammer, trigger and hammer disconnect mechanism as well as the safety mechanism which locks the hammer so that no amount of trigger forcing can result in firing the piece when the safety is applied. In one embodiment of the invention the safety mechanism applies a triple safety lock so that no amount of trigger tampering can result in undesired firing of the arm. The bolt is completely restrained against twisting in the receiver, thereby making it possible to utilize a single positive action extractor and to give a positive feeding guide for loading and extracting. The extractor itself is simple and mounted in the bolt in a manner which makes damage unlikely. The unique charging mechanism eliminates the customary projecting charging or cocking lever which reciprocates with the bolt in a slot in the receiver. The magazine extends up into the bolt so as to be partially enclosed thereby and to assist in controlling the motion of the bolt. The safety is readily adapted to use with either a right or left hand operating lever without any changes in the action itself and without any added cost.

It is accordingly a primary object of the present invention to provide a simple, sturdy firing mechanism which may be manufactured at a relatively low cost.

It is another object of the invention to provide a simple and sturdy firing mechanism utilizing a minimum of springs and other parts.

It is a further object of the invention to provide a firing mechanism wherein rotational motion of the bolt within the receiver is adequately restrained.

It is another object of the invention to provide a firing mechanism which utilizes a single spring to actuate the hammer, trigger, hammer disconnect mechanism, and safety.

It is another object of the invention to provide a simple sturdy relatively low cost firing mechanism having a safety latch which engages the hammer as well as the trigger and which produces a triple lock.

It is another object of the invention to provide a simple and sturdy firing mechanism utilizing a simple charging mechanism which necessitates neither a slot in the receiver exposing the bolt nor a projecting lever which reciprocates with the bolt.

It is still a further object of the invention to provide a safety lock which is adapted to be operated with a right hand or left hand lever without any modification of the firing mechanism.

These and further objects and advantages of the invention will become more apparent upon reference to the following specification and claims and appended drawings wherein:

Figure 1 is a vertical elevation, partly in section, showing a rifle action constructed according to the invention;

Figure 2 is a vertical section of the action taken on the line 2—2 of Figure 1;

Figure 3 is a partial horizontal section of the action of Figure 1 taken on the line 3—3 of Figure 2 and showing the ejector;

Figure 4 is a plan view of the rifle receiver of Figure 1;

Figure 5 is a vertical elevation of the bolt;

Figure 6 is a horizontal section of the bolt taken along the line 6—6 of Figure 5;

Figure 7 is a vertical section of the bolt taken along the center line thereof;

Figure 8 is an enlarged end view of the right end of the bolt shown in Figure 5;

Figure 9 is a vertical end view of the left end of the bolt of Figure 5;

Figure 10 is a vertical elevation of the breech plug;

Figure 11 is an end view of the right end of the breech plug of Figure 10;

Figure 12 is a vertical elevation of the barrel collar;

Figure 13 is a vertical end view of the left end of the barrel collar of Figure 12;

Figure 14 is a vertical elevation of the trigger plate sub-assembly;

Figure 15 is a plan view of the trigger plate sub-assembly showing the trigger, hammer, hammer catch and hammer spring;

Figure 16 is a vertical section of the bolt holding button;

Figure 17 is a side elevation of the safety bar and lever;

Figure 18 is a vertical elevation of the hammer catch;

Figure 19 is a plan view of the hammer catch;

Figure 20 is a plan view of the charger;

Figure 21 is a partial horizontal cross section of the bolt and shows the positive extractor mechanism;

Figure 22 is a plan view of the extractor;

Figure 23 is a side elevation showing another embodiment of a safety latch;

Figure 24 is an end elevation showing the safety latch of Figure 23; and

Figure 25 is a perspective view showing the bolt and barrel and mating action between the barrel, barrel collar and extractor.

The invention is herein described as applied to a semi-automatic rifle, although it will be clear that it is equally adaptable to use in other types of arms, such as semi-automatic pistols, and that certain features of the invention are adaptable to manually operated rifles and shotguns.

Referring to Figure 1 a rifle action shown generally at 10 is comprised of a receiver 12, bolt 14, breech plug 16, and barrel collar 18. Attached to the bottom of the receiver is a magazine housing 26 and a trigger plate 20 housing the trigger 22 and hammer 24. A charger 28 is slidably received in a longitudinal groove 30 in the receiver, as may best be seen in Figure 2, and is held in position by means of a charger cover 32 which is attached to the side of the receiver by means of screws 34.

The breech plug 16 is held in position in the receiver 12 by means of breech plug pin 34 which passes through the side walls of the receiver and through an aperture 36 in the breech plug, as may be seen in Figure 10. By making the breech plug removable and accurately locating it in the receiver by means of a pin passing through the plug and both receiver walls it is possible to mill or drill the plug for the rear sight, thereby eliminating the more costly procedure of providing the rear sight on the assembled plug and receiver. A pair of bolt guide rods 38 having enlarged heads 40, as best seen in Figure 10, are mounted in symmetrical holes in the breech plug and the breech plug is counter-sunk at 42 to receive the rear end of the firing pin to prevent battering. A pair of bolt springs 44 are mounted over guide rods 38 and extend into a pair of apertures 46 in bolt 14 to force the bolt forward against the rear end of the barrel collar 18. The barrel collar 18, which is shown in detail in Figures 12 and 13, is provided at its rear end with a cartridge guide 48 which fits into a groove 50 extending along the bottom of the bolt 14. The cartridge guide 48 may be machined onto the face of the collar 18 at a lower cost than machining it onto the entire barrel unit or onto the receiver as is common practice. Alternatively the cartridge guide may be formed as a separate stamped, cast, machined or coined piece with a pin or screw to assemble it to a simple barrel collar which may be produced on a screw machine. A barrel 51 having a reduced diameter portion 53, as best seen in Figure 1, is mounted in the barrel collar 18 and both the barrel and collar are secured in position in the receiver by means of a single pin 55. The bottom of bolt 14 is cut away at 52 and the bottom of groove 50 defines a cartridge feed rib 54 the face of which picks up the catridges from the magazine in a manner to be described in further detail hereafter.

The bolt 14 is bored at 56 and is counterbored at 58 to receive a firing pin 60 which is slidingly received in the counterbore 58 and which has a reduced diameter portion 62. A firing pin return spring 64 is mounted over the reduced diameter portion 62 and urges the firing pin to the left in Figure 7. The movement of the firing pin is limited by means of firing pin check pin 66 which passes through bore 68 in the bolt and is received in a milled area 69 in the firing pin. The pin 66 retains the firing pin in the bolt and also prevents its forward end from moving past the face 70 of the bolt when the action is fired without a cartridge in the chamber. This eliminates the possibility of damage to the firing pin through striking the rear face of the barrel. The forward face 70 of bolt 14 is recessed at 72 to receive the rim of the cartridge case.

Referring to Figures 2 and 3, an L-shaped ejector 74 has its vertical leg 76 fastened to the side of the receiver by means of a pair of screws 78 and has a horizontal leg 80 extending into the receiver through a slot in the side wall thereof. The inner end of the horizontal leg 80 is provided with a tip 82 for ejecting a cartridge case as the bolt recoils and is received within a longitudinal slot 84 in bolt 14. The guide rods 38 and horizontal leg 80 of ejector 74 effectively restrain the bolt against twisting in the receiver during firing of the action and are assisted by the magazine lips and cartridge feed guide 48 which bear against the inner surfaces of the groove 50 in the bolt and by the extractor which seats in a slot in the barrel and barrel collar, all of which is described in further detail hereinafter.

A single positive extractor mechanism is mounted within the bolt and consists of extractor 86, extractor spring 88 and extractor spring cap 90, as is best seen in Figure 21. Extractor 86 is provided at its front end with an extractor finger 92 and at its rear end with an inwardly extending offset 94 which extends into a bore 96 in bolt 14. The main body of the extractor is received within longitudinal slot 98 in the bolt and the offset 94 is recessed at 100 to receive the extractor spring cap 90. The extractor spring 88 and extractor spring cap 90 are mounted within a further longitudinal bore 102 in the bolt. Referring to Figure 22 it will be seen that the rear edge 104 of the extractor and the forward edge 106 of the offset 94 are parallel and define an angle of less than 90° with respect to the inside edge 108 of the extractor, so that pressure of the extractor spring cap 90 against the rear edge 104 of the extractor tends to rotate the extractor in a counterclockwise direction. The finger 92 on the forward end of the extractor is received within a slot 93 cut into the barrel 51 and barrel collar 18, as is best seen in Figure 25. The extractor is extra large and heavy to give not only superior extraction, but also to serve as a final bolt positioning device when the cartridge has been chambered. The size of the extractor also gives more positive breech closure than is customary because its seating cut does not foul up rapidly as occurs with most current designs. On recoil the extractor finger is hooked over the rim of the cartridge and extracts it from the barrel. It is to be noted that the use of the barrel and barrel collar arrangement of the invention permits the use of a barrel of much smaller diameter than is customarily possible since the extractor slot is partly in the barrel face and partly in the face of the barrel collar.

The charger 28, which is shown in detail in Figure 20, is provided with a knob or projection 110 at one end thereof which acts as a handle. The other end of the charger is provided with a bent portion 112 for engaging the bolt. Referring to Figures 5 and 8, it is seen that the bolt 14 has a recess 114 in the face thereof and this recess receives the bent portion 112 of the charger. The charger is not attached to the bolt and thus does not move as the bolt reciprocates. In addition the groove 30 does not extend through the receiver wall so that no unnecessary exposure of the bolt occurs. Cover plate 32 holds the charger in position on the receiver and permits its easy removal without the necessity of disassembling any other portions of the action. During manual operation the charging handle is returned to a charge position by the force of the bolt and springs. Should the rifle be fired with the muzzle pointed at an extreme upward angle friction maintains the charging handle in its forward position. The bolt simply moves too fast for the charging lever to move to the rear, a condition which might at times interfere with closing of the breech.

Referring to Figures 1, 14 and 15, the trigger plate 20 is fastened to the underside of the receiver by means of a pair of ears 116 and screws 118 and is provided with a pair of trigger pin apertures 122 and hammer pin apertures 120. The upper edge of the trigger plate carries a semi-circular recess 124 for receiving the safety bar as shall be explained in more detail hereinafter. Referring more particularly to Figures 14 and 15, a pair of hammer pin bushings 126 are received within apertures 120 and hammer 24 is pivoted therebetween on hammer pin 130. A bifurcated hammer spring 132 has a pair of coils 134 mounted over hammer pin bushings 126 and the bight 136 of the spring passes beneath the hammer 24 to urge it to rotate in a clockwise direction as shown in Figure 1. The legs 138 of the hammer spring extend along the sides of the hammer to engage a hammer catch or disconnector 140.

A pair of trigger pin bushings 142 are received within apertures 122 in the trigger plate and trigger 22 is pivoted therebetween by means of trigger pin 144. The trigger 22 comprises a generally U-shaped upper portion which consists of a hammer latch 146 and a rectangularly shaped rear portion 148 which, in the uncocked position, engages the rear wall 150 of trigger plate 20. The hammer catch 140, shown in detail in Figures 18 and 19, is pivoted over the rectangular section of the trigger by a hammer catch pin 150. Hammer catch 140 consists of a hood shaped member having a front wall 152, top wall 154, and side walls 156, which are bent back rearwardly from the front wall 152. Apertures 158 are provided in side walls 156 to receive hammer catch pin 150. The rearmost portion of the top wall 154 extends outwardly beyond the side walls 156 of the hammer catch, as shown at 158, and the forward edges of these extensions are hooked at 160 to receive the ends of the legs 138 of hammer spring 132.

Referring to Figure 1, it will be seen that hammer spring 132 simultaneously urges hammer 24 in a clockwise direction and urges hammer catch 140 and trigger 22 in a counterclockwise direction. Hammer 24 carries a downwardly depending leg 162 having a hammer catch detent 164 at the rear thereof and having a trigger detent 166 at the forward edge thereof. When the action is in a cocked position, as shown in Figure 1, the latch 146 on trigger 22 engages trigger detent 166 on hammer 24 to maintain the hammer in a cocked position. If the trigger is pulled to rotate it in a clockwise direction, detent 166 clears latch 146 to allow the hammer to snap forward in a clockwise direction to the dotted line position shown in Figure 1.

Hammer catch 140 prevents automatic operation of the action by means of a lower edge 168 which cooperates with the hammer catch detent 164. If the trigger is held in a firing position after an initial discharge, the edge 168 rides up over the hammer catch detent 164 as the hammer is returned to a cocked position. The hammer catch holds the hammer in such cocked position as long as the trigger is pressed. When the trigger is released hammer catch 140 disengages itself from detent 164 but only after hammer latch 146 has engaged detent 166 to maintain the action in a cocked position until the trigger is again squeezed. It will be seen that the hammer, trigger and hammer catch are all operated by a single spring 132 thereby minimizing jamming due to spring breakage.

The magazine housing 26 is fastened to the underside of the receiver 12 by means of a pair of ears 170 and screws 172 and supports magazine 174 therein. The magazine is held in position by means of a catch spring 176 having an underfolded end 178 which engages an edge 180 at the back of the magazine. The upper end of the magazine extends into the receiver and up into the slot 50 of bolt 14 so that a cartridge at the top of the magazine is in a position to be picked up by the ridge 54 in the slot 50. The entire loading action thus occurs within the bolt.

A bolt holding device is provided for holding the bolt in a retracted position and this is shown in detail in Figure 16. Referring to that figure there is shown an enlarged view of the side of the receiver 12 and bolt 14. The receiver is provided with a threaded aperture 184 which is in alignment with a hole 182 in the bolt when the bolt is in a retracted position. This aperture 184 receives the threaded lower end 188 of a hollow bolt hold housing 186 which carries a bolt hold button 190. The shank 192 of bolt hold button 190 passes through a constricted portion 194 of the bolt hold button housing and has a bolt hold retaining ring 196 adjacent the constricted portion to prevent removal of the bolt hold button. A spring 198 surrounds the shank 192 of bolt hold button 190 and urges the button away from the bolt 14. When the bolt is retracted and the button 190 depressed, its shank 192 enters bore 182 in the bolt and holds the bolt in a retracted position. To release the bolt the charger handle is pressed to the rear to allow bolt hold button 190 to spring to its outward position and the bolt then snaps forward under the action of bolt springs 44.

A safety mechanism is provided and consists of safety bar 200 having a pair of peripheral grooves 201 and having a cam surface 204 therebetween as may be seen in Figure 17. The safety bar is received in a semi-circular depression in the underside of the receiver and is locked against axial movement by the semi-circular depressions 124 in the trigger plate which enter the grooves 201 and rotatably support the safety bar. The safety bar is actuated by means of a safety lever 202 riveted to one end thereof at 203. A dimple 205 is provided in the safety lever to lock it in a safe or fire position.

It will be apparent from the drawings that safety bars can be supplied with levers at either end thereof so that right or left hand safeties are available without modification of the action. The cam surface 204 in the center of the safety bar cooperates with a notch 206 in the hammer head. When the safety is in firing position, as shown in Figure 1, the head of the hammer clears the safety bar. When the bar is rotated in a counterclockwise direction by moving the safety lever 202 to the left in Figure 1, the cam surface 204 enters the notch 206 to force the hammer in a counterclockwise direction and to lock it in that position regardless of actuation of the trigger 22. In this position the trigger is free to move but the hammer is locked so that the rifle cannot be fired. Since the hammer and not the trigger is locked no amount of tampering or forcing the trigger can possibly fire the gun, even if the trigger is literally torn from its pivot.

The operation of the action is as follows: Assume that the action is loaded and cocked and is in the position shown in Figure 1. The trigger is pressed whereby latch 146 clears detent 166 to release the hammer which is driven forward by the bight 136 of compressed hammer spring 132. The hammer 24 drives the firing pin 60 against the primer in the head of the cartridge by striking the rim thereof and this causes the powder in the shell to explode, driving the bullet forward and out of the gun barrel. The rearward thrust of the gases formed by the combustion of the powder pushes the empty cartridge case back against the bolt. The heavy bolt springs 44, together with the friction of the surfaces of the bolt and receiver, keep the action closed until the bullet has left the barrel and the pressure has dropped to safe limits. The blow back of the gases now drives the bolt to the rear, compressing the bolt springs 44. As the bolt moves to the rear the extractor 86 which is set in the bolt and hooked over the now empty shell pulls the shell out of the firing chamber. The rim of the shell strikes against the tip 82 of the ejector arm 80 and is cammed up and out of the action through the ejection port 200 on its right side.

As the bolt passes to the rear over the top of the hammer 24 it cams the hammer down until the detent 166 engages trigger latch 146 if the trigger has been released. If the trigger has not been released but is still being squeezed, detent 164 engages hammer catch 140. The rearward motion of the recoil is stopped by the bolt striking the breech plug 16. As this happens the rear end of the firing pin enters the bore 42 so that it is not battered upon each firing of the action. As the bolt passes to the rear over the top of the magazine, the magazine spring forces a cartridge up into line. The bolt guide bars 38 prevent any rotational motion of the bolt during recoil and the ejector arm 80 riding in bolt slot 84 assists in this action, as do the magazine lips which bear against the surface of slot 50 in the bolt.

The energy stored up by the bolt springs 44 now drives the bolt forward. The feed rib 54 on the bottom of the bolt strips the top cartridge from the magazine and drives it over shell guide 48 into the firing chamber. The action may be initially charged by pulling the charger 28 as far rearwardly as it will go and allowing the bolt to then snap back to its forwardmost position. If desired the bolt may be held in a retract position by means of the bolt hold button 190 and the action may be placed on "safe" by rotating the safety lever 202 in a counterclockwise direction as seen in Figure 1.

While the safety mechanism described in connection with the foregoing example of my invention is entirely adequate and provides a double action lock, I have shown in Figures 23 and 24 a preferred embodiment of a safety which provides a triple lock against inadvertent firing. The interior mechanism of this safety device is similar to that disclosed in the preceding embodiment of the invention and, where applicable, similar reference numerals have been used. The upper section of the safety lever is thus identical to the safety lever 202 in Figure 1 and this is mounted upon a safety bar 200 which is also similar to that used in Figure 1. A lower extension 203 is, however, provided on the safety lever 202 and, referring to Figure 24, this lower section is offset inwardly at 205 so as to be movable adjacent to the side of the trigger plate 20. The lower extension 203 of safety lever 202 is expanded into a sector shaped lower edge 207 which rotates about the safety bar 200. A small slot 209 is provided in the lower right side of the trigger plate housing and a pin 211 which forms a contact means is mounted in the trigger 22 to the rear of and in line with the trigger pin 144. It will be seen that the sector shaped lower end 207 of the extension 203 on safety lever 202 passes in close proximity to the pin 211. With the safety lever in a "fire" position, as shown in Figure 23, the uppermost end 213 of extension 203 engages the underside of the receiver while the lowermost end 215 just clears the pin 211.

The operation of this safety device is as follows. As the upper portion of the safety lever 202 is drawn to the rear in Figure 23, the first movement starts the safety bar 200 turning. The lower end 207 of extension 203 on safety lever 202 moves above the pin 211 on trigger 22 and blocks upward movement. Since the trigger cannot move upon its pivot 144 unless its rear end can be elevated, the pin 211 engaging the sector shaped lower edge 207 of extension 203 positively prevents any movement which could fire the firing mechanism. As the movement of the upper portion of safety lever 202 is continued to the rear in Figure 23 it turns the safety bar 200 causing the edge of the cam surface 204 to force the hammer 24 completely out of engagement with the trigger 22 in a disconnecting movement, working the hammer against the power of the spring 132, as can be more clearly seen in Figure 1. As this occurs the sector shaped lower edge 207 of the extension 203 on safety lever 202 continues to lock the pin 211 and thus prevent trigger movement. In the final rearward movement of the upper portion of safety lever 202 the hammer is locked out of contact with the trigger by means of cam surface 204 best seen in Figure 1 and is lowered sufficiently so that the bolt assembly can be removed through the rear of the receiver without difficulty. Further rearward movement of the upper portion of safety lever 202 is positively stopped by engagement of the offset 205 against the underside of the receiver. In order to place the firing mechanism in firing position, the upper portion of safety lever 202 is pushed forward in Figure 23 and initially continues to block movement of the trigger 22. The hammer is then unlocked and allowed to raise into contact position under the urging of the spring 132. Continued forward movement of the upper portion of safety lever 202 continues to keep the trigger blocked but the connection between the hammer and trigger is reestablished. The final one or two degrees of movement of lever 202 draws the lower extension 203 out of the line of trigger pin 211 so that the trigger is now able to pivot and the arm can be fired.

The triple locking action of the foregoing safety will be apparent as follows: First, there is a trigger lock which prevents movement of the trigger, second, there is a disconnecting lock wherein the detent or sear 166 on the hammer is mechanically withdrawn from the trigger contact, and third, the safety bar 200 mechanically locks the hammer down so that no blows, direct or indirect, intentional or unintentional, can let the hammer rotate to hit the firing pin. This type of mechanical lock coupled with disconnection is believed to be the most positive form of safety possible. As with the preceding embodiment of the invention it will be apparent upon inspection of the figures of the drawings that the safety may be provided either on the left hand or the right hand side of the action without modification of the action.

The firing mechanism of this invention is simple and rugged in construction and utilizes a minimum of springs and parts so that very few stoppages or breakages are likely to be encountered. A single spring is utilized to directly actuate the hammer, trigger, hammer catch or disconnector, and its leg ends also serve as spring stops for the trigger, bearing against the underside of the receiver. This same spring also acts indirectly through the pressure it applies to the hammer to lock the trigger out of hammer contact when the full safety is mechanically applied by turning the safety lever and also to lock the trigger out of hammer contact as a further accidental firing preventative. The bolt is completely restrained against twisting during reciprocation by means of a continuous guide principle. While bolt twisting in conventional firing mechanisms is commonly opposed only by the travel of the cocking lever in its travel slot and possibly ejector guiding, the bolt of the instant firing mechanism is continuously guided in the following manner. In the closed bolt position, the front end of the bolt is guided by the extractor having its front end received in the slot in the barrel and collar and the cartridge feed guide 48 attached to the barrel collar is keyed into the slot 50 in the bottom of the bolt. As the bolt begins to move rearwardly the ejector locks the bolt to the receiver against twisting action and the two recoil springs operating on separate guides further prevent twisting. The magazine lips also extend into the underside of the bolt in slot 50 to serve as a further guide. Finally, the flat 52 on the underside of the cylindrical bolt rides over the hammer and the hammer spring constantly forces the hammer up into this flat to serve both as a brake to the recoil action and as an anti-twist device.

In a semi-automatic arm of the type illustrated it is of the utmost importance to have the breech open as slowly as possible to allow chamber pressure to diminish. Unless this is done the pressure tends to blow out the head of the cartridge case which then jams the rifle and throws bits of hot brass out the ejection port. This slow opening is customarily accomplished through the use of heavy springs which, over a period of time, tend to take a permanent set and become unreliable. In other conventional arms heavy weights or heavy moving members are utilized to slow breech opening and these must be closely timed for proper performance, with the result that they are not efficient with a variety of brands or lots of ammunition wherein pressures may vary greatly or where there may be wide variations in ignition rates.

In the firing mechanism illustrated herein opening of the breech is controlled through a combination of bolt mass and weight together with friction of the bolt and the other guide control units as set out hereinbefore, In addition to this the weight and angle of the hammer is also utilized to slow down the opening of the breech. It should be noted that in most semi-automatic rifles or firing mechanism the so-called striker system is utilized for ignition. According to this system a pin or striker is driven forward by the firing spring to discharge the arm. Such devices act in a straight line and afford a minimum of friction, mass and weight. According to the present invention a rotating hammer of considerable weight and mass is utilized and, in addition, this hammer is so mounted that the instant of firing the hammer is leaning into the rear of the bolt. Thus when the arm is fired initial opening of the breech is further retarded by the fact that the bolt in order to start its rearward motion must overcome the friction and weight of the hammer at a mechanical disadvantage.

The use of dual opposed springs and guides allows a balanced absorption of the rearward thrust over a wider bolt area than is conventional. This gives opposition across the entire area of the bolt face and opposes bolt opening in a highly efficient manner. In actual operation there is a further advantage in that while the system slows down the breech opening under the most violent high pressure cartridges, the dual springs and guides working in the bolt plug allow a gradual slowing down of the bolt as the breech begins to open and breech gases can escape relatively slowly. When lower pressure cartriges are used, the same holding factors hold the breech closed at the instant of firing but due to the length of the required stroke it is not necessary to compress the springs to a minimum size in order to eject, cock and reload, as is customarily required. Thus a type of overstroke is provided which makes the arm more reliable with all pressure cartridges. The recoil springs cannot "set" if the bolt should be carried to an extreme position by high pressure reaction, and the firing pin cannot be battered since a seat is provided for it in the face of the bolt plug. On the other hand, if the cartridge presures are of lesser force they still cause the action to function properly without the necessity of the bolt traveling to its rearmost position. The bolt plug may be formed of a shock absorbent material such as nylon plastic or a similar material to further dampen the recoil action.

It is also important to note that the breech closure on a loaded cartridge is relatively firm and gradual. The length and positioning of the springs allows the use of soft springs which, together with the bolt control factors, exert a continuing pressure rather than a slamming action as the breech closes, and this together with the wide and heavy extractor tends to positively close the breech without bolt rebound. With striker type of firing most commonly encountered in low cost arms of the type here illustrated, if the breech is not fully closed when the striker is released by trigger pull the heavy striker spring required by this system may still fire the cartridge. This can also happen when the striker is slightly too long or when fouling clogs the extractor slot to prevent full closing, or where the bolt rebounds due to too stiff a recoil spring which causes jamming. In certain other more costly deigns where a firing hammer system is used, the construction is such that the hammer can fire the rifle before it is fully closed. In the design disclosed herein the hammer can reach the firing pin to strike a firing blow only when the breech is closed. Should the hammer be deliberately released before the breech is fully closed it strikes against the lower face of the rear of the bolt and drives the bolt ahead without firing the cartridge.

The invention may be embodied in other specific forms without departing from the spirit or essential characteristics thereof, the present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A gun action firing mechanism comprising a receiver having a trigger housing atatched thereto, a hammer pivotally mounted in said trigger housing on a pivot means, said hammer having a downwardly extending portion having detent means on the front and back thereof, a trigger pivotally mounted in said housing on pivot means and having a first upwardly extending portion for engaging said front detent means on said hammer, said trigger having a second upwardly extending portion spaced from said first portion, hammer catch means pivotally mounted on said second portion for engaging said back detent means, and a spring in said housing urging said hammer to rotate in one direction and urging said trigger and said hammer catch means to rotate in an opposite direction, said spring engaging the underside of said receiver to serve as a resilient stop to pull of the trigger.

2. A gun action as set out in claim 1 wherein said spring is bifurcated and has a bight thereof engaging said hammer and legs engaging said hammer catch means.

3. A gun action as set out in claim 2 wherein said spring includes a pair of coiled portions encircling said pivot means on which said hammer is mounted.

4. In a gun action including a housing, a hammer pivotally mounted therein, a trigger mounted in said housing for engaging a sear on said hammer, and spring means urging said hammer and trigger to rotate in different directions; a contact means on said trigger, a safety bar extending transversely of said housing and having cam means thereon for camming said hammer to disengage said sear from said trigger and for locking said hammer when said safety bar is in a first position, and lever means fixed to said bar and rotatable therewith into said first and into a second position, said lever means engaging said contact means on said trigger when said safety bar is in said first position, said safety bar being rotatable to a second position wherein said cam means clears said hammer and said lever means clears said contact means.

5. In a gun action including a housing, a hammer pivotally mounted therein, a trigger mounted in said housing for engaging a sear on said hammer, and spring means urging said hammer and trigger to rotate in different directions; a contact means on said trigger, a safety bar extending transversely of said housing, lever means fixed to said bar and rotatable therewith into first and second positions, said lever means being clear of said contact means when in said first position, but engaging said contact means on said trigger when moved from said first position toward said second position, and cam means on said safety bar engaging said hammer as said lever means is moved past the position where said lever means first engages said contact means, said cam means acting to disengage said hammer and trigger and locking said hammer as said lever means is moved into said second position.

6. A device as set out in claim 5 wherein said lever means engages said contact means after moving only a small fraction of the distance from said first position to said second position.

7. A device as set out in claim 6 wherein said hammer and trigger are mounted in a trigger housing and said bar extends transversely of said housing, said lever means being attached to said bar externally of said trigger housing, and said contact means extending through a side wall of said housing.

8. In a gun action including a receiver, a housing mounted beneath said receiver, a trigger mounted in said housing, a hammer mounted in said housing, and spring means urging said hammer and trigger in different rotational directions; a contact means on said trigger, a safety bar extending transversely of said housing, lever means attached to said bar for pivotal movement therewith and having a first portion thereof engaging the underside of said receiver when said lever means is in a first position, said lever means engaging said contact means on said trigger when moved from said first position, and cam means on said safety bar engaging said hammer as said lever means is moved away from said first position past the position where said lever means first engages said contact means, said cam means acting to disengage said hammer and trigger and locking said hammer as said lever means is moved into a second position wherein a second portion of said lever means engages the underside of said receiver.

9. A device as set out in claim 8 wherein said lever means is mounted on said bar exteriorly of said housing and said contact means comprises a pin on said trigger extending through an opening in said housing.

10. A gun action firing mechanism comprising a trigger housing, a hammer pivotally mounted in said trigger housing and having a downwardly extending portion with detent means on the front and back thereof, a trigger pivotally mounted in said housing and having a first upwardly extending portion for engaging the detent means on the front of said hammer, said trigger having a second upwardly extending portion spaced from said first portion, hammer catch means pivotally mounted on said second portion for engaging the detent means on the back of said hammer, and a spring in said housing engaging said hammer catch means and said hammer and urging said hammer to rotate in one direction and said trigger and said hammer catch means to rotate in the opposite direction.

11. A gun action as set out in claim 10 wherein said hammer catch means comprises a hood shaped member having a front wall which engages said hammer detent, side walls which are pivoted to said trigger, and a top wall having spaced portions engaged by said spring.

12. A gun action as set out in claim 10 including a safety bar extending across the top of said hammer and having a cam surface which clears said hammer in a first position and which cams said hammer downwardly out of engagement with said first upwardly extending portion of said trigger in a second position, and an actuating lever on one end of said safety bar.

13. A gun action as set out in claim 12 wherein said trigger has a contact means thereon cooperating with said lever, said lever clearing said contact means in said first position but engaging said contact means when moved out of said first position toward a second position.

References Cited in the file of this patent

UNITED STATES PATENTS

| | | |
|---|---|---|
| 689,283 | Browning | Dec. 17, 1901 |
| 1,245,889 | Duflot | Nov. 6, 1917 |
| 1,324,493 | Burton | Dec. 9, 1919 |
| 1,704,889 | Gardiner | Mar. 12, 1929 |
| 1,786,536 | Holek | Dec. 30, 1930 |
| 2,068,289 | Gurney | Jan. 19, 1937 |
| 2,079,039 | Razee | May 4, 1937 |
| 2,182,693 | Harton | Dec. 5, 1939 |
| 2,191,521 | Crockett | Feb. 27, 1940 |
| 2,356,256 | Loomis | Aug. 22, 1944 |
| 2,401,903 | Browning | June 11, 1946 |
| 2,437,137 | Swebilius | Mar. 2, 1948 |
| 2,492,815 | Robinson | Dec. 27, 1949 |
| 2,539,554 | Sampson et al. | Jan. 30, 1951 |
| 2,590,862 | Hoppert | Apr. 1, 1952 |
| 2,600,176 | Williams | June 10, 1952 |
| 2,659,994 | Yale | Nov. 24, 1953 |
| 2,669,050 | Quick | Feb. 16, 1954 |
| 2,679,706 | Windle | June 1, 1954 |
| 2,711,041 | Harvey | June 21, 1955 |
| 2,711,043 | Bent | June 21, 1955 |
| 2,725,655 | Maillard | Dec. 6, 1955 |
| 2,749,642 | Lassen | June 12, 1956 |
| 2,758,404 | Tabor | Aug. 14, 1956 |
| 2,765,562 | Roper et al. | Oct. 9, 1956 |

FOREIGN PATENTS

| | | |
|---|---|---|
| 604,085 | France | Jan. 18, 1926 |